United States Patent
Nakagawa et al.

(10) Patent No.: US 7,579,104 B2
(45) Date of Patent: Aug. 25, 2009

(54) METHOD OF PRESERVING FUEL CELL MEMBRANE ELECTRODE ASSEMBLY

(75) Inventors: Takashi Nakagawa, Moriguchi (JP); Masatoshi Teranishi, Settsu (JP); Yoichiro Tsuji, Katano (JP)

(73) Assignee: Panasonic Corporation, Osaka (JP)

( * ) Notice: Subject to any disclaimer, the term of this patent is extended or adjusted under 35 U.S.C. 154(b) by 134 days.

(21) Appl. No.: 11/980,604

(22) Filed: Oct. 31, 2007

(65) Prior Publication Data

US 2008/0069726 A1 Mar. 20, 2008

Related U.S. Application Data

(62) Division of application No. 11/071,468, filed on Mar. 4, 2005, now Pat. No. 7,364,815.

(30) Foreign Application Priority Data

Mar. 9, 2004 (JP) .............................. 2004-065196
Aug. 25, 2004 (JP) .............................. 2004-245566

(51) Int. Cl.
*H01M 8/02* (2006.01)
*H01M 8/10* (2006.01)

(52) U.S. Cl. .......................................... 429/48; 429/30

(58) Field of Classification Search .................. 429/34, 429/35, 48
See application file for complete search history.

(56) References Cited

U.S. PATENT DOCUMENTS

| 5,178,969 | A | * | 1/1993 | Amemiya | ..................... 429/26 |
| 6,322,920 | B1 | * | 11/2001 | Tomson | ..................... 429/34 |
| 2003/0054213 | A1 | | 3/2003 | Ishikawa | |
| 2005/0031917 | A1 | | 2/2005 | Margiott et al. | |

FOREIGN PATENT DOCUMENTS

| JP | 6-251788 | | 9/1994 |
| JP | 2000-289380 | * | 10/2000 |
| JP | 2002-93448 | | 3/2002 |

* cited by examiner

*Primary Examiner*—Patrick Ryan
*Assistant Examiner*—Ben Lewis
(74) *Attorney, Agent, or Firm*—Wenderoth, Lind & Ponack, L.L.P.

(57) ABSTRACT

A method of preserving a fuel cell membrane electrode assembly in which catalyst electrodes are stacked on each surface of a polymer electrolyte is to preserve the fuel cell membrane electrode assembly in an airtight package that prevents oxygen, moisture and a function inhibitor from permeating through the package.

3 Claims, 9 Drawing Sheets

METHOD OF PRESERVING FUEL CELL MEMBRANE ELECTRODE ASSEMBLY

This is a divisional application of Ser. No. 11/071,468, filed Mar. 4, 2005 now U.S. Pat. No. 7,364,815.

BACKGROUND OF THE INVENTION

1. Field of the Invention

The present invention relates to a method of preserving a fuel cell membrane electrode assembly in which an air electrode and a fuel electrode are respectively stacked onto the surfaces of a polymer electrolyte.

2. Description of the Related Art

Recently, a fuel cell has attracted a great deal of attention as a clean power-generating resource. A variety of types of fuel cells are provided, and a polymer-electrolyte-type fuel cell is among them.

The polymer-electrolyte-type fuel cell has a so-called fuel cell stack (tandem cell) in which a plurality of smallest units, each being called a "unit cell" and generating power, are stacked in series. By providing the fuel cell stack with a unit for providing oxygen and fuel or a unit for cooling down the tandem cell, a desired power (voltage) can be obtained through a reaction between hydrogen and oxygen in each unit cell.

The unit cell has a separator for conducting electricity and separating the assemblies which are adjacent to each other when unit cells are stacked. It is the fuel cell membrane electrode assembly that mainly controls the reaction between hydrogen and oxygen.

The fuel cell membrane electrode assembly includes an electrolyte made of a polymer ion-exchange membrane that is similar to a fluoropolymer ion-exchange membrane that has a sulfonic group. The fuel cell membrane electrode assembly also includes a cathode catalyst layer that becomes an air electrode and an anode catalyst layer that becomes a fuel electrode when placed on each surface of the electrolyte. For example, metal made of platinum and ruthenium is used for the anode catalyst layer while platinum is used for the cathode catalyst layer.

The fuel cell membrane electrode assembly with the structure as described above causes a reaction between oxygen and hydrogen as follows: hydrogen gas provided for the fuel electrode is changed into hydrogen ion in the anode catalyst layer; and the hydrogen ion is moved, in a state of hydration, to the oxygen electrode's side through the electrolyte. The ion then reacts with oxygen and electron and generates water in the cathode catalyst layer. By repeating the reaction, the fuel cell membrane electrode assembly generates power (voltage).

Such a polymer electrolyte fuel cell is manufactured almost in sequence from a manufacturing of a unit cell, an assembling of a fuel cell stack through to a final process of assembling a fuel cell. Therefore, it is possible to manufacture a fuel cell that has satisfactory functions.

Today, an era of mass production of fuel cells is about to coincide with the spread of fuel cell use. There is a good possibility for a necessity to preserve, for a long time, without degrading the function thereof, the parts used for assembling a fuel cell in order to maintain the desired functions throughout the process of manufacturing. For example, the following method is conceivable for preserving a fuel cell stack in an atmosphere that is purged of air (oxygen): purging with the use of inert gas, or purging with the use of moisture, so that the air (oxygen) remaining in a fluid channel which is placed in a separator that transmits oxygen gas and hydrogen gas can be eliminated (see reference to Japanese Laid-Open Applications No. 2002-93448 and No. 06-251788). Another preservation method involving using an oxygen-absorbing substance is suggested as a technique of preserving a fuel cell stack in an atmosphere that is purged of oxygen (see reference to Japanese Laid-Open Application No. 2000-289380).

It is possible to preserve the fuel cell stack for a long time, using the conventional method. Along with the progress in general use of fuel cells, however, in some cases, only fuel cell membrane electrode assemblies are manufactured and transported to a distant place. In this case, the conventional method is not effective.

After diligent research through the years in view of the conventional techniques, the inventors of the present invention have comes, to discover a cause of the problem generated in the preservation of fuel cell membrane electrode assembly.

According to the research, the cause of the problem turns out to be the use of alcohol in the process of manufacturing a catalyst that makes up a membrane electrode assembly. For example, acetylene black carbon powder that supports platinum-ruthenium metal particles or platinum particles is used as a catalyst powder, and a pasty catalyst is manufactured by dispersing this catalyst powder onto ethyl alcohol that contains perfluoro-carbon sulfone acid powder. The pasty catalyst is spread over a non-woven fabric made of carbon. A catalyst layer is formed in this way. A membrane electrode assembly is manufactured by sandwiching the electrolyte with two catalyst layers whose surface on which the catalyst is applied faces toward the electrolyte.

The alcohol remains, however, on the non-woven fabric even after the membrane electrode assembly is manufactured. If the membrane electrode assembly is preserved in such condition, oxide is generated as a result of the reaction between oxygen in the air and the alcohol, which affects the catalyst. The obtained observation is that the catalyst layer itself may be degenerated due to the long-term preservation of the membrane electrode assembly.

Another observation is that, in some cases, a dust such as an organic compound contained in the air may stick to the membrane electrode assembly depending on the environmental condition in a factory or a stock room, and the catalyst may be degenerated if an unnecessary organic compound adheres to the membrane electrode assembly for a long time.

In the case where metallic (transition metal in particular) particulates reach the electrolyte, the metal particles are ionized since the electrolyte is strongly acid. When the electrolyte to which ionized metallic particles adhere is provided to the fuel cell so that the fuel cell is activated, hydroxyl radical is generated as a result of the reaction between hydrogen peroxide generated due to the gas that cross leaks from the electrolyte or the secondary reactions, and the ionized metal adhering to the metal particulates. The electrolyte is decomposed by the generated hydroxyl radical. The observation shows that, after the decomposition of the electrolyte, the electrolyte increasingly cross leaks so as to accelerate the decomposition of the electrolyte resulting in decreases in film pressure of the electrolyte that are evident to the extent that power cannot be constantly generated.

It has also been observed that after the exposure to the oxygen in the air, each of the catalyst layers rises to a high voltage that is close to 1V. This accelerates oxidization of a metallic catalyst such as carrier carbon, platinum and ruthenium in the catalyst layer. Due to the oxidization, the catalyst layer loses its function as a catalyst or the catalyst melts out of the catalyst layer which makes the layer deficient.

Moreover, it turns out that the change in humidity in the environment where the fuel cell membrane electrode assembly is preserved causes damage to the electrolyte or to the catalyst layer after the repetition of expansion and shrinking of the electrolyte.

The inventors also discovered that in the case where the fuel cell membrane electrode assembly falls into one of the above cases, the fuel cell made of such fuel cell membrane electrode assembly can be a cause of degradation in initial characteristic such as voltage and/or current characteristic or a cause of degradation in serviceability of the fuel cell over a long term.

It has also been found that the expansion and shrinking of the electrolyte also causes change in size, which renders it difficult or impossible to build up a unit cell.

Note that in the case where an oxygen-absorbing substance is placed in a package that has low oxygen permeability, the problem of oxidization can be prevented. However, the oxygen-absorbing substance must be carefully selected because in some cases a substance that accelerates decomposition of electrolyte may be emitted from the oxygen-absorbing substance.

SUMMARY OF THE INVENTION

The present invention is conceived in view of the problems in the prior art and the above observations made by the inventors. An object of the present invention is to provide a method of preserving a fuel cell membrane electrode assembly that can suppress the degradation in the characteristics of the fuel cell made of the fuel cell membrane electrode assembly that has been preserved, even in the case where only the fuel cell membrane electrode assembly is preserved for a long period of time.

In order to achieve the above object, a method according to the present invention of preserving fuel cell membrane electrode assembly having a catalyst electrode stacked on each surface of a polymer electrolyte, includes: preserving the fuel cell membrane electrode assembly in an airtight package that prevents oxygen, moisture and a function inhibitor from permeating through the package.

Thus, it is possible to maintain the atmosphere in the airtight package after the package is sealed, and prevent the degradation in the functions of the membrane electrode assembly and the adhesion of unnecessary substances to the membrane electrode assembly.

According to the method, an atmosphere in the airtight package may have a lower oxygen concentration than air.

In this way, it is possible to prevent the damage to the catalyst layers and degradation of the catalyst layers which are caused by oxidization of the membrane electrode assembly or oxidization of organic substances that remain in the membrane electrode assembly.

According to the method, a concentration of fuel gas in an atmosphere of the airtight package that has just been sealed may be higher than a concentration of fuel gas in air.

This causes a reaction between the fuel gas and the residual oxygen through the catalyst in the membrane electrode assembly so that the airtight package is filled with the atmosphere that has little amount of oxygen.

According to the method, a deoxidizer may be placed in the airtight package.

As a result, the airtight package can be easily filled with an atmosphere that has little amount of oxygen, and thereby, it is possible to easily prevent the functions of the membrane electrode assembly from being degraded with time.

According to the method, a concentration of inert gas in an atmosphere of the airtight package may be higher than a concentration of inert gas in air.

Thus, a concentration of other gas such as oxygen can be relatively low, which makes it possible to obtain the same operational effects as can be obtained with the atmosphere that has a low oxygen concentration.

According to the method, the airtight package in which the fuel membrane electrode assembly is placed may be sealed after an atmosphere of the airtight package is purged with preservative gas.

By applying this method, it is possible to preserve the membrane electrode assembly in a desired atmosphere, and thereby prevent the functions of the membrane electrode assembly from being degraded due to a long-term preservation.

According to the method, the preservative gas may have a same degree of humidity as humidity inside the airtight package which has not yet been purged of oxygen.

Thus, the change in humidity can be suppressed even at an earlier time of the preservation of the membrane electrode assembly, and the change in size of the membrane electrode assembly at an initial stage can be prevented as well. This prevents the functions such as initial characteristics and serviceability from being degraded due to a long-term preservation of the membrane electrode assembly.

According to the method, the airtight package in which the membrane electrode assembly is preserved is sealed after an atmosphere of the airtight package is filled with preservative gas.

With the method described above, it is possible to preserve the membrane electrode assembly in a desired atmosphere within the airtight container, and thereby to suppress the function degradation caused by a long-term preservation.

According to the method, a degree of humidity in the preservative gas atmosphere may be as same as a humidity of an atmosphere around the fuel cell membrane electrode assembly that has not yet been preserved in the airtight package.

Thus, the change in humidity can be suppressed even at an earlier time of the preservation of the membrane electrode assembly, and the change in size of the membrane electrode assembly at initial stage can be prevented as well. This prevents the functions such as initial characteristics and serviceability from being degraded due to a long-term preservation of the membrane electrode assembly.

According to the method, an amount of oxygen permeated through the airtight package is 0.1 ml/(m$^2$/day/atm) or below and moisture permeability is 0.1 g/(m$^2$/day) or below.

Thus, it is possible to specify the characteristics of the airtight container that enable the membrane electrode assembly to be preserved over a long period of time.

According to the method, a surface of the catalyst electrode of the fuel cell membrane electrode assembly may be covered with a protective film that has high oxygen barrier properties.

Thus, the contact between the membrane electrode assembly and the oxygen can be directly interrupted, and moreover, the degradation of the functions such as initial characteristics and serviceability caused by the long-term preservation of the membrane electrode assembly can be prevented. Furthermore, a cushioning function of the film can prevent deficiencies in the membrane electrode assembly caused by shocks given from outside or a contact between the membrane electrode assemblies.

FURTHER INFORMATION ABOUT TECHNICAL BACKGROUND TO THIS APPLICATION

The disclosure of Japanese Patent Applications No. 2004-065196 filed on Mar. 9, 2004 and No. 2004-245566 filed on Aug. 25, 2004, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

The following describes the embodiments of the present invention with reference to the diagrams.

First Embodiment

Figure 1:
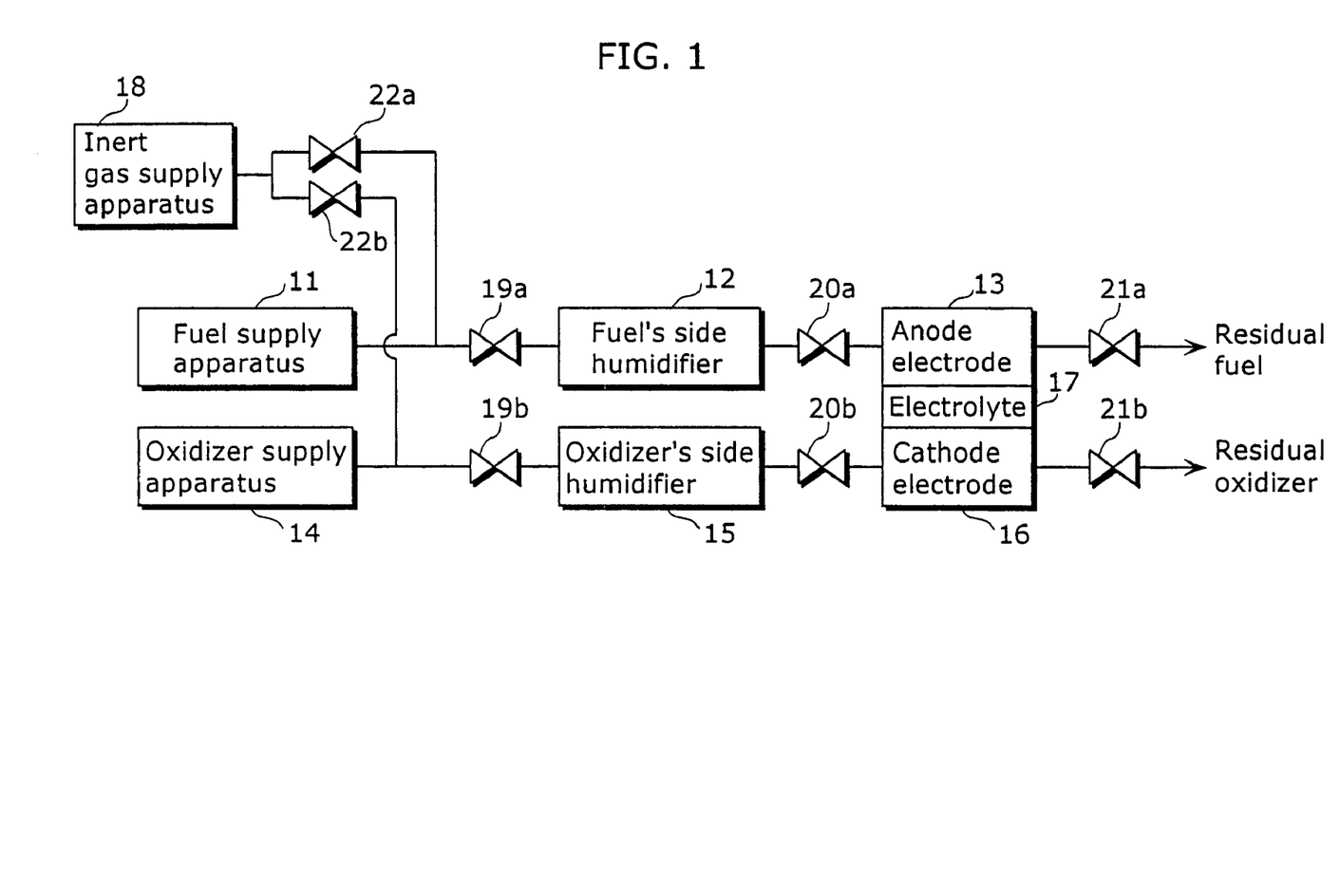
FIG. 1 is a schematic diagram showing a conventional method of preserving a fuel cell stack.
Figure 2:
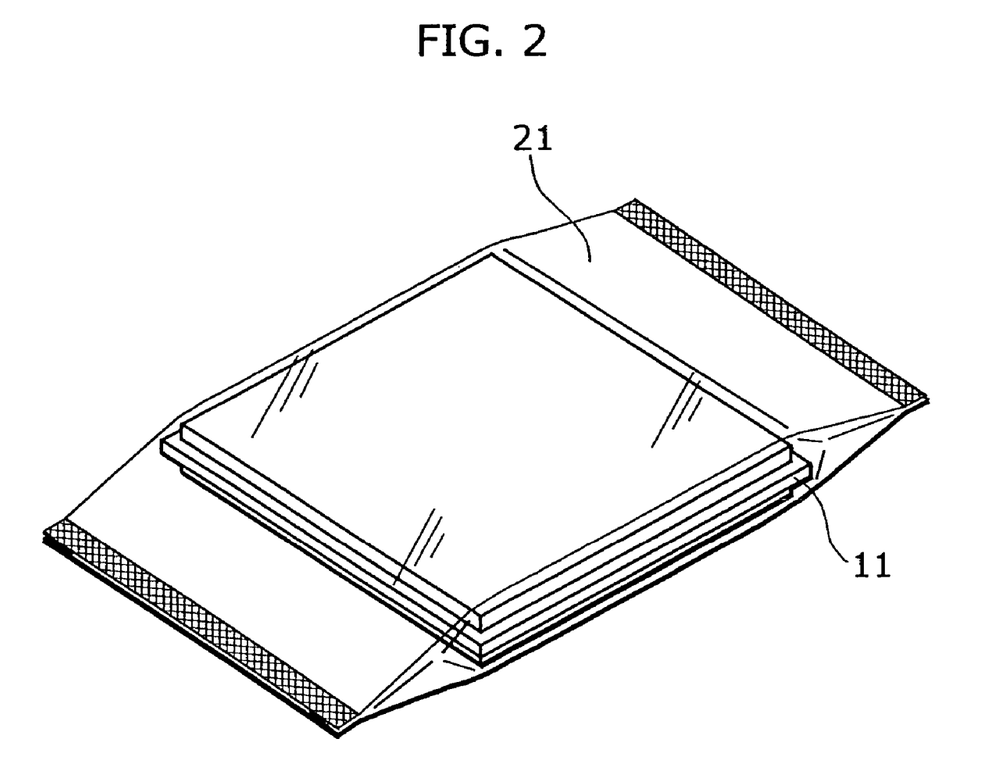
FIG. 2 is a perspective view showing a condition in which a membrane electrode assembly is preserved according to embodiments of the present invention.

FIG. 2 is a perspective view showing a condition in which a fuel cell membrane electrode assembly is preserved according to the embodiments of the present invention.

Figure 3:
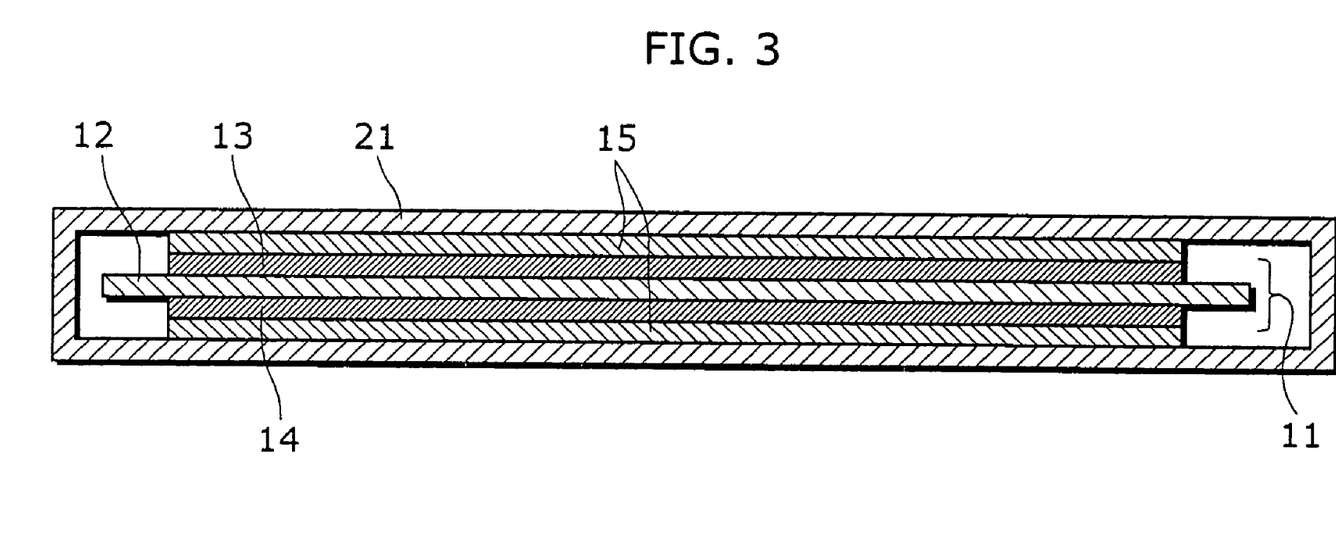
FIG. 3 is a cross-sectional view showing a condition in which a membrane electrode assembly is preserved according to the embodiments of the present invention.

FIG. 3 is a cross-sectional view in the case of virtually cutting a membrane electrode assembly 11 preserved in an airtight package 21.

As shown in FIGS. 2 and 3, the membrane electrode assembly 11 is preserved in the airtight package 21 that is a bag made of resin.

The membrane electrode assembly 11 is a fuel cell membrane electrode assembly with a structure in which an anode catalyst layer 13 and a cathode catalyst layer 14 are stacked respectively on each surface of a polymer electrolyte 12. Each of the catalyst layers 13 and 14 has a structure in which carbon mesh supports the catalyst, and is vulnerable against shocks. As shown in detail in FIG. 3, a gas diffusion layer 15 is placed on one of the surfaces of the respective catalyst layers 13 and 14.

The airtight package 21 is made up of materials with high sealing properties for preventing oxygen, moisture and function inhibitors from being transmitted. The airtight package 21 may be a stiff container with a stable form, however, a bag made of a flexible polymeric film with low moisture permeability and low oxygen permeability is more preferable because such bag can be preserved without taking up much space when it is not used for the preservation of membrane electrode assembly 11.

More precisely, the airtight package 21 needs moisture permeability of 0.1 $g/m^2/day$ or less and oxygen permeability of 0.1 $cc/m^2/day/atm$ or less. This is because degradation with time of the membrane electrode assembly 11 becomes serious unless both of the conditions are satisfied. It is desirable if moisture permeability is 0.01 $g/m^2/day$ or less and oxygen permeability is 0.01 $cc/m^2/day/atm$ or less. With the conditions satisfied, the airtight package 21 can serve for a long-term preservation.

Material can be selected for the airtight package 21 from the following: a plastic film or a ceramic evaporated film, of polyvinyl chloride (PVDC), of ethylene-vinylalcohol (EVOH), of polyvinyl alcohol (PVA) and of polyamide (PA), a single aluminum evaporated film, a single aluminum foil laminated film, or a film made by laminating plural barrier materials, or a film made by compounding the barrier materials used for a barrier layer and a polymeric film.

Representative examples of the polymeric film are the following: a PVDC coat OPP, a PVA coat OPP, an EVOH co-extruded OPP, a PVDC coat ONY, a multilayered barrier ONY (MXD, an EVOH co-extruded), a PVDC coat PET, a PVA coat PET, a PVDC coat cellophane, an EVOH film, an extensible PVA film, a hybrid barrier coat film, an alumina evaporated film (an alumina (Al2O3) evaporated PET, a silica (SiOx) evaporated PET, an alumina evaporated ONY, an alumina evaporated OPP), an aluminum evaporated film (aluminum evaporated PET, an aluminum evaporated CPP, an aluminum evaporated OPP, an aluminum evaporated ONY and an aluminum evaporated PE), or the like.

Note that OPP stands for bi-oriented propylene, ONY stands for biaxially-oriented nylon, and CPP signifies inextensible propylene while MXD denotes polyamide resin with barrier properties and PET denotes poly-ethylene terephthalate.

The thickness of the airtight package 21 is not strictly specified, but it only requires the above materials and to be thick enough to retain moisture permeability of 0.1 $g/m^2/day$ or less and oxygen permeability of 0.1 $cc/m^2/day/atm$ or less. Vapor depositing aluminum onto the film made of the above materials can surprisingly decrease moisture permeability as well as oxygen permeability, which makes the airtight package 21 thinner.

By using the airtight package 21 made of the above-mentioned material so as to retain moisture permeability of 0.1 $g/m^2/day$ or less, it is possible to prevent the vapor from leaking out of the airtight package 21, and thus, to avoid change in amount of moisture inside the airtight package 21. However, when rapid change in temperature is generated outside the airtight package 21, dropwise condensation is generated and humidity changes greatly in the airtight package 21. It is therefore advisable that the membrane electrode assembly 11 be preserved in a place, e.g., a hygrostat and temperature-controlled bath where temperature can be maintained within a predetermined range, but not in a place where temperature greatly fluctuates. In this way, it is possible to prevent the change in the amount of moisture in the polymer electrolyte as well as the degradation of the polymer electrolyte.

The use of the airtight package 21 can also prevent an inclusion of function inhibitors from outside as well as decrease in functions of the fuel cell caused by the function inhibitor adhering to the membrane electrode assembly 11.

Here, function inhibitors are, for instance, a metallic element such as an organic substance, iron and transition metal, and metallic fine particles. Such function inhibitors include not only a substance that degrades the functions of the membrane electrode assembly 11 during a long-term preservation, but also a substance that decreases the function as a fuel cell by adhering to the membrane electrode assembly 11.

Note that in preserving the membrane electrode assembly 11 without the catalyst layers 13 and 14 (i.e. at the stage where the assembly 11 includes only the polymer electrolyte 12 under the process of assembly), it is possible to prevent the contact between the polymer electrolyte 12 and oxygen or function inhibitors so as to maintain the amount of moisture, by preserving the polymer electrolyte 12 covered with a protective film 16 in the airtight package 21. It is thus possible to prevent the decrease of functions of polymer electrolyte 12 even in the case of preserving the polymer electrolyte 12 for a long period of time.

Figure 4:
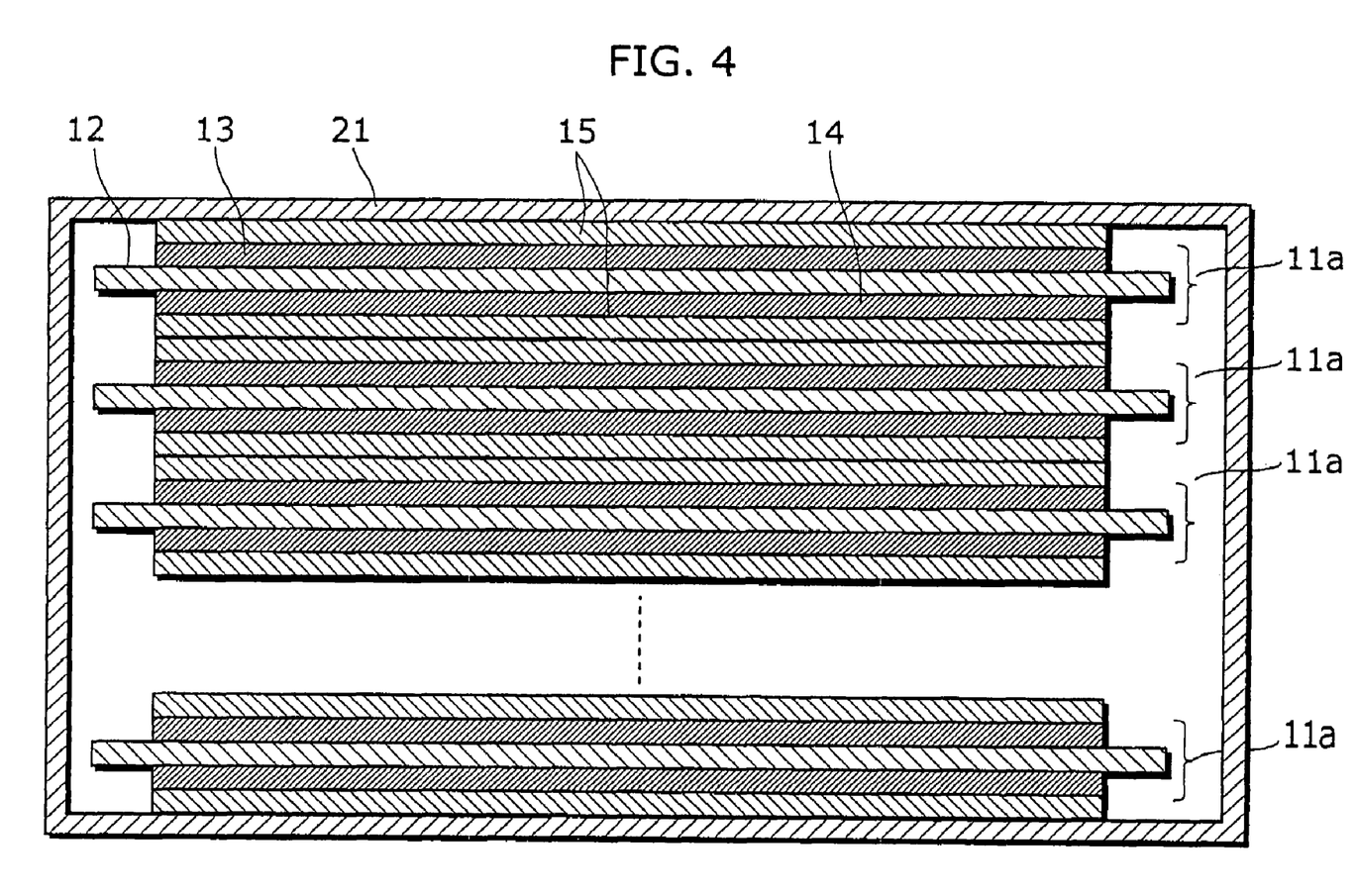
FIG. 4 is a cross-sectional view showing a condition in which plural membrane electrode assemblies are preserved in a single airtight package, according to the first embodiment.

FIG. 4 is a cross-sectional view showing the case of preserving plural fuel cell membrane electrode assemblies 11 in such manner that they are stacked.

In the airtight package 21, the plural membrane electrode assemblies 11 are sealed in such manner that they are stacked whereas gas diffusion layers 15 are stacked on the catalyst layers 13 and 14 such that a gas diffusion layer 15 of one membrane electrode assembly 11 is in contact with a gas diffusion layer 15 of another membrane electrode assembly 11.

Thus, it is also possible to preserve plural membrane electrode assemblies 11 all together in the airtight package 21.

By preserving the membrane electrode assembly 11 as described above, it is possible to preserve a single fuel cell membrane electrode assembly 11 in the airtight package 21 which prevents oxygen, moisture and function inhibitor from being transmitted under the condition where the atmosphere is purged of oxygen and where change in the amount of moisture (humidity) in the airtight package 21 is suppressed. This therefore leads to the prevention of decrease in power-generating function during the preservation of the fuel cell membrane electrode assembly 11, which does not cause degradation in the function of the membrane electrode assembly 11 over a long period.

It is also possible to fill the airtight package 21 with water. The oxygen can be eliminated out of the airtight package 21 by pouring water into the airtight package 21. As the membrane electrode assembly 11 is surrounded by water, change in amount of moisture in the polymer electrolyte 12 can be prevented. It is desirable to use purified or distilled water for the filling because it does not contain any function inhibitors.

Second Embodiment

The following describes the second embodiment with reference to the diagrams.

Figure 5:
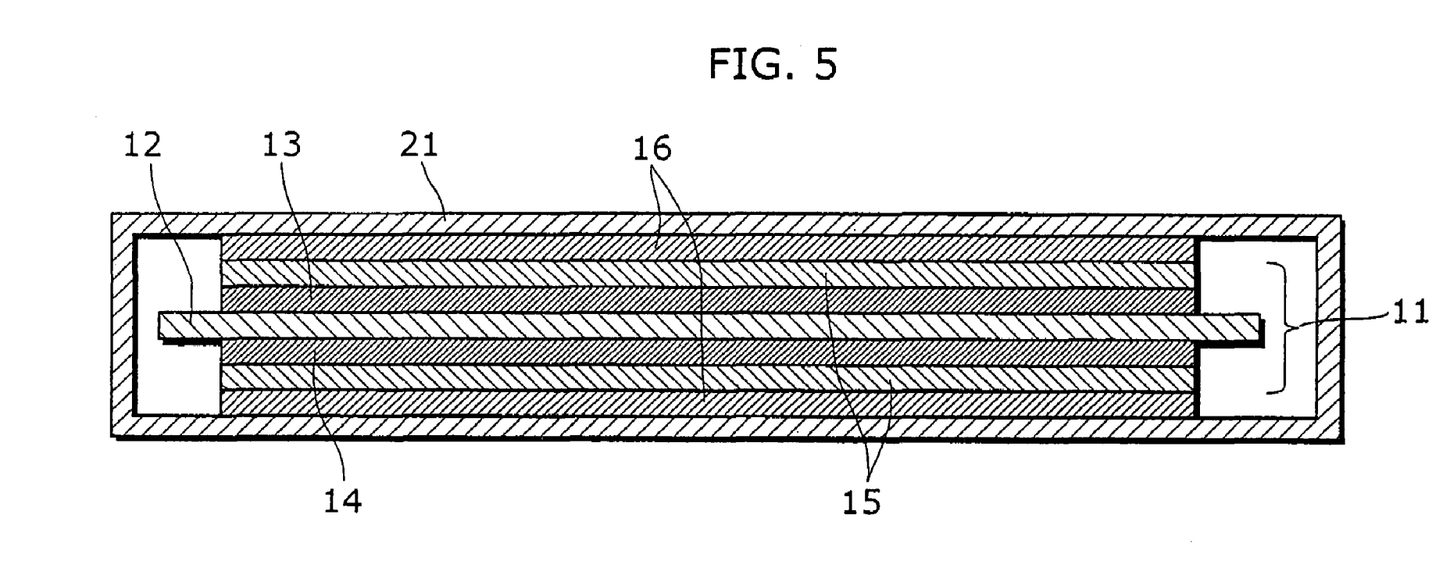
FIG. 5 is a cross-sectional view showing a condition in which a membrane electrode assembly covered with a protective film is preserved according to a second embodiment.

FIG. 5 is a cross-sectional view showing the condition in which the membrane electrode assembly 11, whose surface is covered with the protective film 16, is preserved.

The membrane electrode assembly 11 and the airtight package 21 are the same as those described in the first embodiment, therefore, the description is not repeated here.

The protective film 16 plays a role of directly preventing the contact between the membrane electrode assembly 11 and oxygen or function inhibitors that remain in the airtight package 21. The protective film 16 also serves as a cushioning medium to prevent the damage to the surface of the catalyst. A polymer film resin with high barrier properties against oxygen is used as a material for the protective film 16. Note that the same material as used for the airtight package 21 may be used for the protective film 16.

The membrane electrode assembly 11 has a structure in which the anode catalyst layer 13 and the cathode catalyst layer 14 are stacked on each surface of the polymer electrolyte 12. The gas diffusion layer 15 is placed on each of the catalyst layers 13 and 14.

Even in the case where the membrane electrode assembly 11 has the gas diffusion layers 15, the contact between the surface of the catalyst and oxygen or function inhibitors is further reduced, and change in the amount of moisture on the surface of the catalyst further decreases as well, by covering the surface with the protective film 16. The covering has a purpose to allow the gas diffusion layers to serve as protective films, which further prevents the degradation of the power-generating function of the membrane electrode assembly 11 due to the long-term preservation. Therefore, it is desirable to preserve the membrane electrode assembly 11 that includes the gas diffusion layer 15.

Figure 6:
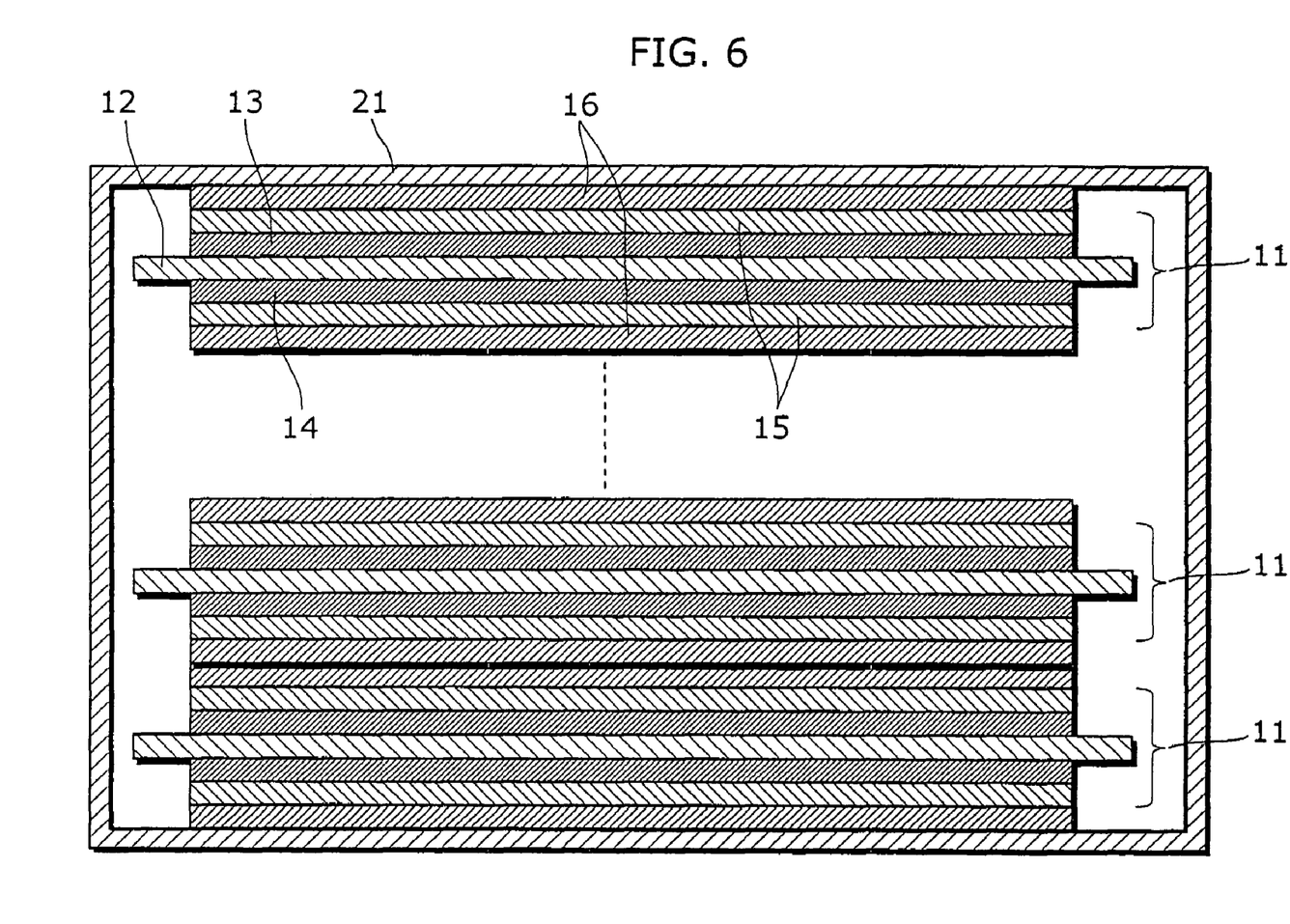
FIG. 6 is a cross-sectional view showing a condition in which plural membrane electrode assemblies, each being covered with a protective film, are preserved in a single airtight package, according to the second embodiment.

FIG. 6 is a cross-sectional view showing the case of preserving plural membrane electrode assemblies 11 in a single airtight package 21.

In the airtight package 21, plural membrane electrode assemblies 11 are sealed in such manner that they are stacked on each other. By covering the surface of each of the membrane electrode assemblies 11 with the protective film 16, it is possible to preserve them in a single airtight package 21 so that the membrane electrode assemblies 11 contact each other without being damaged.

Note that in the present embodiment, each membrane electrode assembly 11 has a gas diffusion layer 15, however, in some cases, the membrane electrode assembly 11 without the gas diffusion layer 15 may be preserved.

Method 1 for Creating an Atmosphere of the Airtight Package 21

The following describes a method for creating the atmosphere that has low oxygen concentration in the airtight package 21.

Figure 7:
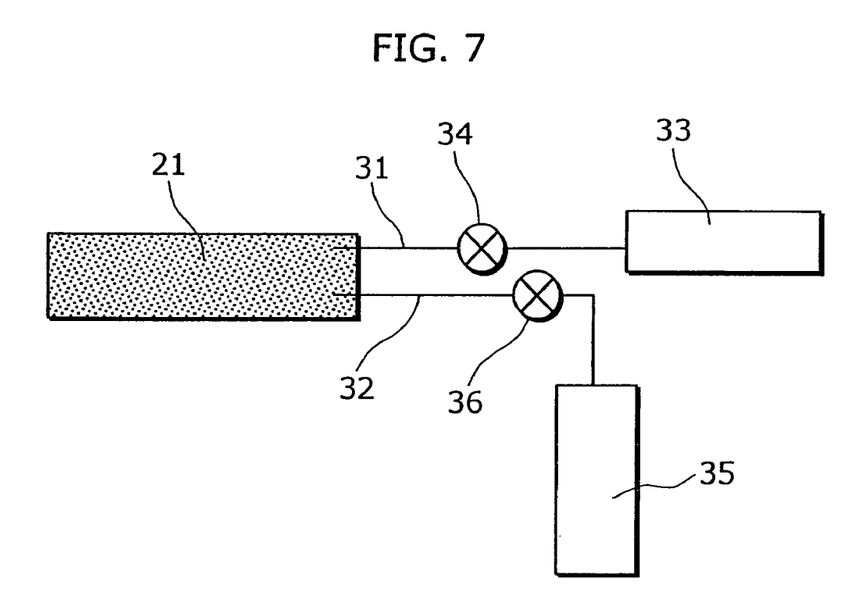
FIG. 7 is a sketch of an apparatus for purging inside the airtight package with the use of preservative gas, according to the second embodiment.

The membrane electrode assembly 11 is inserted in a bag-type airtight package 21 that is party opened.

As shown in FIG. 7, an air release pipe 31 that exhausts gas from the airtight package 21 and a supply pipe 32 that provides preservative gas are inserted, while an opening of the airtight package 21, in which the membrane electrode assembly 11 is inserted, is held down.

The air release pipe 31 is connected to a gas exhaust apparatus 33, and opens or closes with an air release valve 34 while the supply pipe 32 is connected to a gas supply apparatus 35, and opens or closes with a supply valve 36.

Then, the air release valve 34 is released so that the air in the airtight package 21 is introduced to outside and the airtight package 21 is vacuumed. After this, the air release valve 34 and the supply valve 36 are switched to be closed, and the airtight package 21 is filled with preservative gas.

Lastly, the opening is heat-shielded at the same time when the pipes 31 and 32 are pulled out so that the airtight package 21 is sealed off.

Note that pipes to be used for the air release pipe 31 and the supply pipe 32 may be same or different. In the case of using the same pipe, a valve for switching a line for gas release to a line for gas supply is used.

The preservative gas only requires gas with low oxygen concentration, and it is preferable that the gas has inert gas as a main component. The gas may contain fuel gas, but still has inert gas as a main component.

The fuel gas may be represented by hydrogen gas, and is provided to the anode's side in the fuel cell.

In the case where the preservative gas includes such fuel gas, the fuel gas included in the preservative gas and a slight amount of oxygen gas that remains in the airtight package 21 or that comes into the airtight package 21 from outside are used for a burning reaction generated in the catalyst layer in the membrane electrode assembly 11. Therefore, neither the oxygen gas remains in the airtight package 21, nor the catalyst layer is maintained at high level voltage due to the oxidization of the membrane electrode assembly 11 or oxygen. This prevents degradation of the functions of the membrane electrode assembly 11.

The inert gas includes nitrogen, but may include helium and argon instead.

Furthermore, the airtight package 21 may be filled with inert gas that includes fuel gas based on the following methods: encapsulating fuel gas after purging the atmosphere with inert gas; and purging the atmosphere with inert gas after encapsulating fuel gas. Here, the respective gas can be encapsulated into the airtight package 21 by separately operating a pipe for encapsulating inert gas and a pipe for encapsulating fuel gas, by switching between the valves.

By allowing the preservative gas to have the same degree of humidity as humidity of the condition in which the membrane electrode assembly 11 is manufactured, it is possible to prevent change in the degree of humidity at the time of gas purging.

It is described that the opening is sealed based on the method of thermo compression bonding, however, a method based on zipping or a method based on compression may be applied instead. Note that the method based on thermo compression bonding is desirable for its excellent sealing properties and easy process.

In this way, the atmosphere inside the airtight package 21 can be purged with preservative gas, which can fill the airtight package 21 with a desirable atmosphere.

Method 2 for Creating an Atmosphere in the Airtight Package 21

The following describes another method of filling the airtight package 21 with the atmosphere that has low oxygen condensation.

Figure 8:
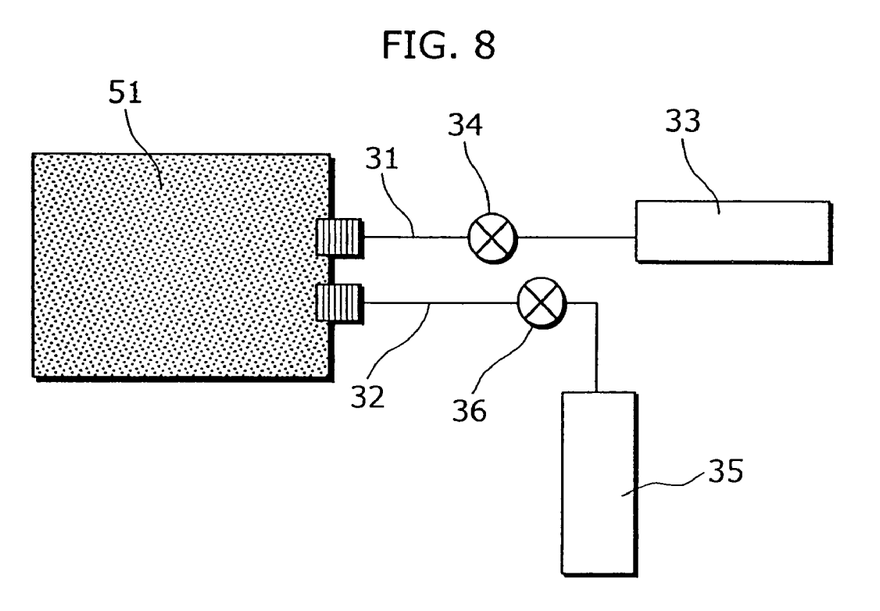
FIG. 8 is a sketch of an apparatus for filling the airtight package with preservative gas, according to the second embodiment.

First, the membrane electrode assembly 11 is inserted into the bag-type airtight package 21 a part of which is opened.

Then, the airtight package 21, in which the membrane electrode assembly 11 is inserted, is placed in a large chamber 51 as shown in FIG. 8.

The fuel cell membrane electrode assembly 11 covered with the protective film 16 is inserted into the airtight package 21. The membrane electrode assembly 11 may include the diffusion layer 15 or may be at a stage where only the catalyst layers 13 and 14 are stacked onto the polymer electrolyte 12.

The airtight package 21 may be made of metal or resin that prevents moisture and function inhibitors from entering from outside.

The chamber 51 includes the air release pipe 31 for deaerating the gas within the chamber 51, and the supply pipe 32 for providing preservative gas such as inert gas and fuel gas. The on-off valves 34 and 36 are respectively connected to the air release pipe 31 and the supply pipe 32 so that gas release and gas supply can be arbitrarily performed. The air release pipe 31 and the supply pipe 32 may be the same pipe. In this case, the connection to the air release pipe 31 and the supply pipe 32 may be changed using the valves.

Then, the on-off valves 34 and 36 are controlled so as to provide the chamber 51 with inert gas that contains fuel gas, after the chamber 51 is vacuumed by vacuuming the air. The pressure after the provision of inert gas is assumed to be 1 atm.

Lastly, the opening of the airtight package 21 is sealed within the chamber 51 using the thermo compression bonding method or the like, so that the air is vacuumed.

This method is preferable since plural membrane electrode assemblies 11 can be simultaneously sealed in the chamber 51 filled with the preservative gas atmosphere according to the capacity of the chamber 51. Even in the case where air is vacuumed out of the airtight package 21, it is possible to prevent the damages to the catalyst layers 13 and 14 caused by the atmospheric pressure, because the atmospheric pressure does not directly affect the membrane electrode assembly 11.

Method 3 for Creating an Atmosphere in the Airtight Package 21

Figure 9:
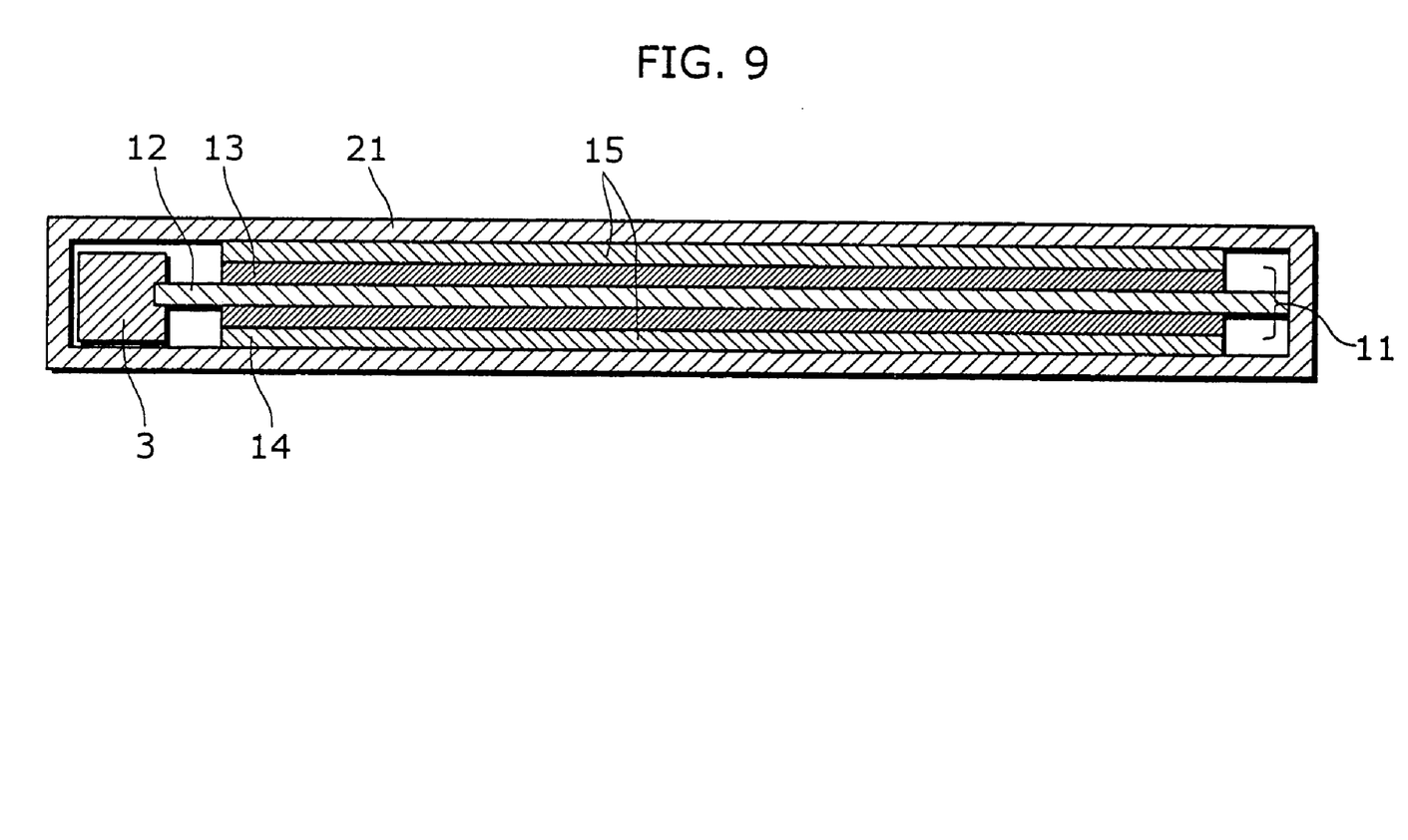
FIG. 9 is a cross-sectional view showing a condition for rendering the airtight package to have the atmosphere with low oxygen concentration, according to the second embodiment.

FIG. 9 is a cross-sectional view showing the condition in which the membrane electrode assembly 11 is preserved in the airtight package 21 in which a deoxidizer 3 is placed.

In the case of using the deoxidizer 3, the deoxidizer 3 is put into the airtight package 21 so that the airtight package 21 is sealed off in the air.

Thus, with the use of deoxidizer 3, it is easy to fill the airtight package 21 with the atmosphere that has low oxygen condensation.

In the case of using the deoxidizer 3, it is also possible to selectively exclude the oxygen that leaks from outside. Even in the case where the airtight package 21 has a low degree of closure, the atmosphere in the airtight package 21 can be continuously purged of oxygen for a predetermined period of time.

It is desirable to use an auto-reactive, organic deoxidizer. Such deoxidizer does not require moisture from outside, therefore, can prevent change in amount of moisture within the airtight package 21. In contrast, an iron deoxidizer rapidly absorbs oxygen and is economic in terms of cost, however, has deficiencies in depending on moisture and causing change in amount of moisture within the airtight package 21. It is therefore desirable not to use iron for fuel cells since it becomes a function inhibitor that degrades the power-generating function equipped in the fuel cell.

EXAMPLE

Figure 10:
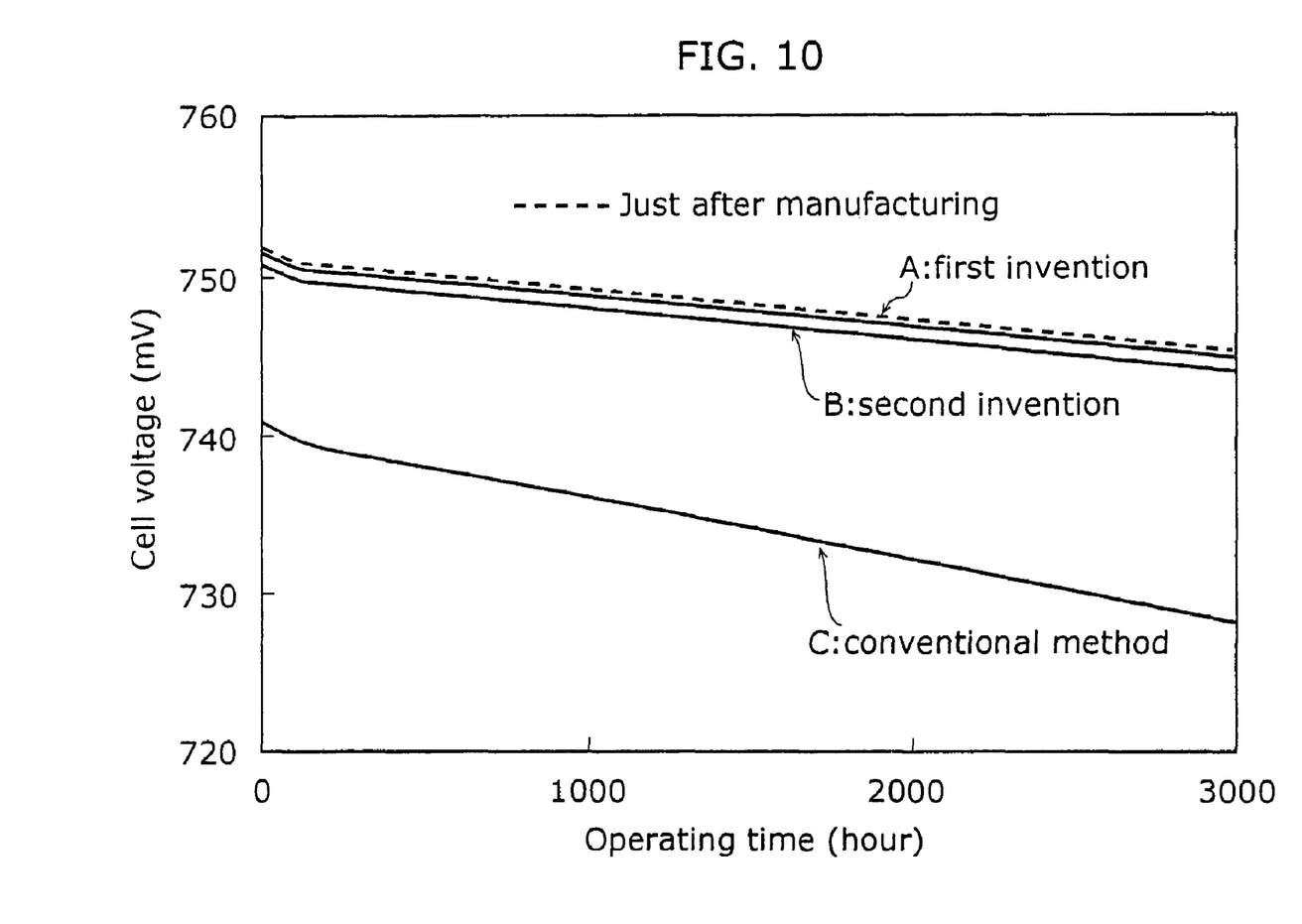
FIG. 10 is a graph showing how cell voltages of different groups vary with time.

The following describes, with reference to FIG. 10, the result of examining a possibility to prevent the decrease in the power-generating function as well as the decrease of the serviceability which are equipped in the membrane electrode assembly 11 that is preserved based on the preservation method according to the present invention.

Firstly, the number of membrane electrode assemblies 11 as many as they can form at least three fuel batteries was provided. A group A covered each of the membrane electrode assemblies 11 with an EVOH film and then left, for a year, the assemblies 11 in the airtight package 21 filled with an inert gas atmosphere. A group B left, for a year, the membrane electrode assemblies 11 in the airtight package 21 filled with the inert gas atmosphere. A group C wrapped each of the membrane electrode assemblies 11 with a polyethylene sheet and left the assemblies 11 for a year. After that, each of the membrane electrode assemblies 11 classified by each group is stacked together with a separator so as to make a fuel cell.

In the examination, hydrogen gas is provided as a fuel for an anode electrode while air is provided for a cathode electrode as a gas that contains an oxidizer. The conditions are as follows: the temperature in a cell is 70□; fuel utilization is 70%; oxygen utilization is 40%; and power flux density is 0.2 A/cm².

FIG. 10 shows how cell voltages of different groups vary with time until the operating time reaches 3000 hours. Note that a broken line in the diagram indicates, for comparison, the result of generating power in a fuel cell that has just been manufactured.

According to the observation, at initial stage, cell voltage of the membrane electrode assemblies 11 (A) and (B) that are preserved based on the preservation method according to the present invention is higher than that of the membrane electrode assembly 11 (C) that is preserved based on the conventional preservation method, and is almost as same as the cell voltage in the case of generating power in the membrane electrode assembly 11 that has just been manufactured. With regard to the voltage decay rate until the operation time reaches 3000 hours, the voltage decay rate of the cell voltage based on the method according to the present invention is lower than that of the cell voltage based on the conventional preservation method, and is almost as same as the voltage decay rate of the cell voltage in the case of generating power in the membrane electrode assembly 11 that has just been manufactured. In the case of further continuing, for a long time, the power generation in the cell, for which the membrane electrode assembly 11 that is preserved based on the conventional preservation method is used, compared to the case of generating power in the cell for which the membrane electrode assembly 11 that has just been manufactured is used, the following results are obtained: the degradation of polymer electrolyte progresses faster than usual; and the voltage rapidly decreases in a very short time, which causes inability to generate power. It is also verified that the cell voltage can be always maintained at higher level in the group A which covered the membrane electrode assembly 11 with an EVOH film than the group B which didn't.

Therefore, the preservation method according to the present invention can prevent decrease in terms of both power-generating function and serviceability of the membrane electrode assembly 11 caused by long-term preservation better than the conventional preservation method. The same effects are obtained in the case where the membrane electrode assembly 11 is left under the environmental condition that ordinary temperature is between 20 to 30 degrees Celsius, high temperature is between 50 to 60 degrees Celsius, and low temperature is between 0 to 10 degrees Celsius.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The invention claimed is:

1. A method of preserving a fuel cell membrane electrode assembly in which a catalyst electrode is arranged on each surface of a polymer electrolyte in a layered manner, the method comprising:

covering the membrane electrode assembly with a flexible polymeric film with moisture permeability of 0.1 g/m²/day or less and oxygen permeability of 0.1 cc/m²/day/atm or less;

providing a space around a portion of the polymer electrolyte, which projects beyond the catalyst electrode; and filling the space with inert gas.

2. The method of preserving a fuel cell membrane electrode assembly according to claim 1, wherein a surface of the catalyst electrode, which is positioned opposite to the electrolyte, is in contact with the polymeric film.

3. The method of preserving a fuel cell membrane electrode assembly according to claim 1, wherein the inert gas is fuel gas.

* * * * *